United States Patent
Savry et al.

(10) Patent No.: US 7,841,528 B2
(45) Date of Patent: Nov. 30, 2010

(54) SYSTEM FOR SECURE COMMUNICATION BETWEEN A CONTACTLESS CARD READER AND A CARD

(75) Inventors: Olivier Savry, Sassenage (FR); Thierry Thomas, Varces Allieres et Risset (FR)

(73) Assignee: Commissariat a l'Energie Atomique (FR)

( * ) Notice: Subject to any disclaimer, the term of this patent is extended or adjusted under 35 U.S.C. 154(b) by 451 days.

(21) Appl. No.: 12/053,715

(22) Filed: Mar. 24, 2008

(65) Prior Publication Data

US 2008/0237346 A1    Oct. 2, 2008

(30) Foreign Application Priority Data

Mar. 27, 2007    (FR) ................................... 07 02227

(51) Int. Cl.
*H04Q 5/22*    (2006.01)
*G06K 7/00*    (2006.01)

(52) U.S. Cl. ........................ 235/439; 340/10.3; 340/10.4
(58) Field of Classification Search ................. 235/439; 340/10.1, 10.3, 10.4
See application file for complete search history.

(56) References Cited

U.S. PATENT DOCUMENTS

2004/0100359 A1    5/2004    Reade et al.
2007/0016944 A1    1/2007    Hansen
2009/0021343 A1*   1/2009    Sinha ........................ 340/5.2

FOREIGN PATENT DOCUMENTS

| FR | 2 875 976 | 3/2006 |
| WO | WO 2005020445 A2 * | 3/2005 |
| WO | WO 2006 035178 | 4/2006 |

* cited by examiner

*Primary Examiner*—Daniel A Hess
(74) *Attorney, Agent, or Firm*—Lowe Hauptman Ham & Berner, LLP

(57) ABSTRACT

The invention relates to contactless communication systems between a moving object and a reader, in particular systems in which the moving object is a chip card or an identification tag. To enhance communication security, the card reader transmits, from a radiofrequency transmission antenna separate from the main communication antenna, a disturbance signal having the same frequency and modulation type characteristics as the response signal expected from the card to the reader; the electromagnetic coupling between this separate antenna and the antenna of the reader is, however, such that the latter does not "see" the transmitted disturbance but detects only the response from the card; on the other hand, the environment between the card and the reader sees the response from the card only mixed with the disturbance signal.

15 Claims, 3 Drawing Sheets

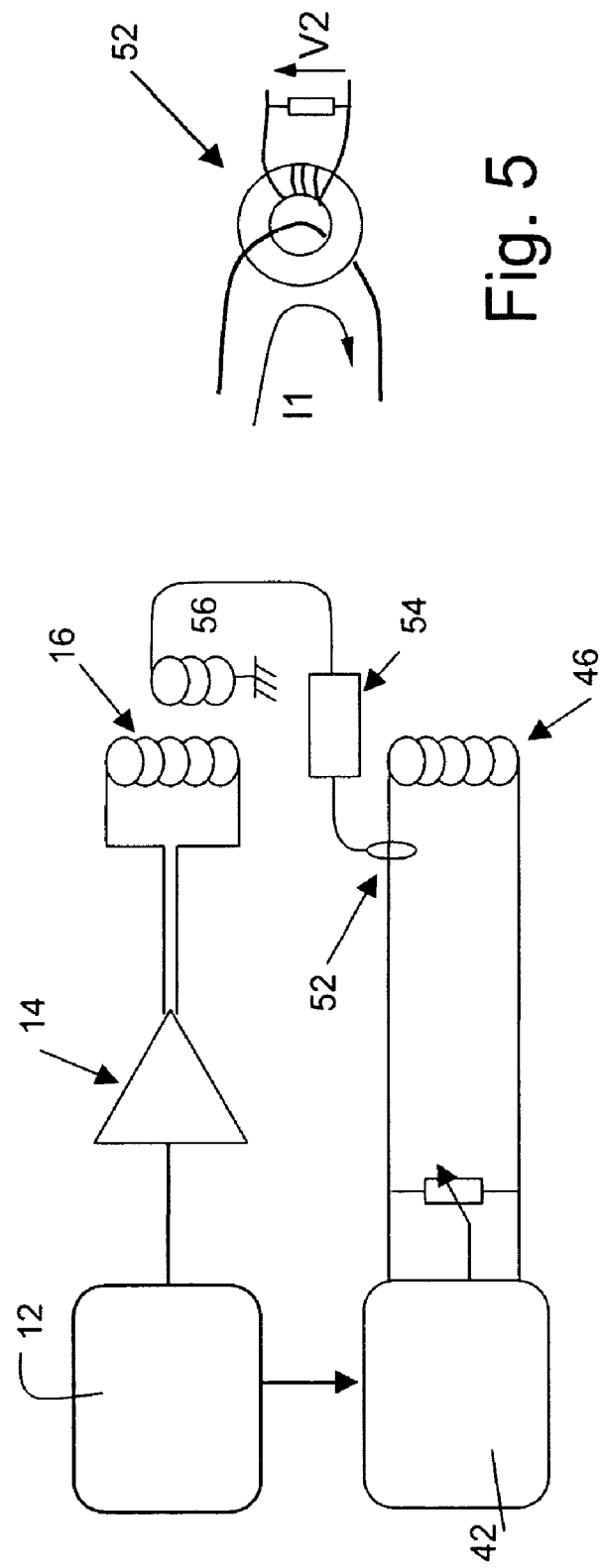
Fig. 4
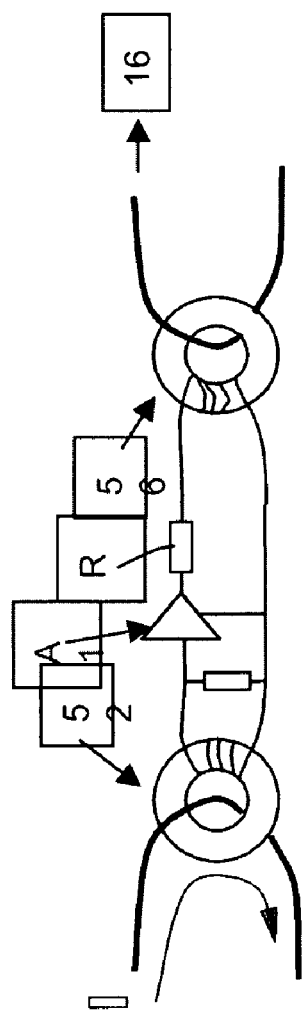
Fig. 5
Fig. 6

SYSTEM FOR SECURE COMMUNICATION BETWEEN A CONTACTLESS CARD READER AND A CARD

RELATED APPLICATIONS

The present application is based on, and claims priority from, French Application Number 07 02227, filed Mar. 27, 2007, the disclosure of which is hereby incorporated by reference herein in its entirety.

FIELD OF THE INVENTION

The invention relates to contactless communication systems between a moving object and a reader, in particular systems in which the moving object is a chip card or an identification tag, the communication being set up by electromagnetic transmission, with no physical contact between the card or the tag and the reader.

BACKGROUND OF THE INVENTION

Hereinafter, the moving object shall be denoted "card", it being understood that this designation does not in a limiting way designate a particular form of object, and that it applies in particular to a radiofrequency identification tag normally designated "RFID tag".

In these systems, the reader generally sends a radiofrequency carrier, periodically modulated to form a radiofrequency interrogation signal; a typical frequency is 13.56 MHz, amplitude or frequency modulated, and it is this frequency that will be mentioned in the examples that follow; the reader then waits for a response; if a card likely to communicate with the reader is present in a determined geographic field near to the reader, the card responds and dialogues with the reader. The response can be the transmission of a simple digital identification, or can even be more complex. The card can be without any independent power source, and in this case the power that enables it to send its response is supplied inductively by the reader; the power can even be supplied by the interrogation signal itself for very short distance communication applications (a few centimetres to a few tens of centimetres, even a few metres).

These communication systems can be used in particular for secure identification applications and the confidential content of the dialogue between the card and the reader must be protected against possible intrusions by malicious third parties. It is in particular essential to prevent a third party from accessing the data sent by the card, because the observation, then the copying, of data transmitted by an authentic card could be used to then deceive the system with a false card.

Such protection is obtained mainly by the use of methods of encrypting the response from the card: the card sends an encrypted response instead of sending a plain language response, and only the reader can in theory decrypt the response. The encryption methods are, however, not 100% safe; if the stakes are high, cheats can manage to determine the encryption keys by picking up and analysing the radiofrequency signals transmitted in the communication field between the card and the reader.

To enhance security, patent application WO2006035178 proposes that the reader transmit a scrambling electromagnetic noise in the useful field where the card is located, at the same time as the card transmits its response; the electromagnetic noise then prevents a third party from detecting the response transmitted by the card. The noise is sent in the frequency spectral band of the useful signal transmitted by the card, and it has particular characteristics, that the reader knows, such that the reader can subtract it from the received radiofrequency signal. The subtraction is not, however, easy because of the fact that the injection of noise acts as a modulation of the carrier of the communication signal which is transmitted by the reader to the card, this noise modulation being superimposed on a useful modulation that is necessary for the communication to the card.

SUMMARY OF THE INVENTION

The present invention aims to enhance the system and for this proposes the use of a separate radiofrequency transmission antenna for transmitting a disturbance signal having the same frequency and modulation type characteristics as the response signal expected from the card to the reader; the electromagnetic coupling between this separate antenna and the antenna of the reader is, however, such that the latter does not "see" the transmitted disturbance but detects only the response from the card; on the other hand, the environment between the card and the reader sees the response from the card only mixed with the disturbance signal; this disturbance signal is of the same type as the response, and a cheat who tries to pick up the electromagnetic signals in the vicinity of the reader and of the card cannot obtain the genuine response from the card.

Thus, if the expected response from the card is an amplitude or frequency modulation by a binary signal transmitted at a modulation rate Fm and modulating a carrier frequency Fp or a subcarrier frequency Fsp, the disturbance signal will preferably be a random series of bits (random to constitute a scrambling signal and not information) sent at a rate Fm and amplitude or frequency modulating a carrier frequency Fp or a subcarrier frequency Fsp.

Consequently, according to the invention, there is proposed a secure communication system between a contactless card reader and a card, in which the reader transmits an electromagnetic radiofrequency communication signal addressed to a card located in the near field and the card transmits a response signal, to be protected against an undesirable detection, the reader detecting the response signal by means of a first antenna and the reader comprising a circuit for generating a disturbance signal to create a disturbance signal at the same time as the response signal transmitted by the card, characterized in that the circuit for generating the disturbance signal is able to transmit a disturbance signal with the same frequency and modulation type characteristics as the response signal expected from the card to the reader, this circuit comprising a second radiofrequency transmission antenna, separate from the first antenna, for transmitting the disturbance signal, the electromagnetic coupling between the two antennas being such that the first antenna retransmits to the reader mainly the response from the card but not the disturbance signal.

In a first embodiment, provision is made for the two antennas to be positioned relative to each other in such a way as to have a minimal, preferably zero, mutual electromagnetic coupling, such that the first antenna does not receive or practically does not receive the signal transmitted by the second antenna.

In a second embodiment, a current measuring probe is provided in the circuit powering the second antenna, as is a circuit for compensating the signal received by the first antenna, the compensation circuit being connected on the one hand to the current measuring probe and on the other hand to the first antenna to apply to the first antenna a signal neutralizing the effect on the first antenna of the disturbance signal transmitted by the second antenna.

The antennas are preferably of inductive type (single-turn or multiple-turn windings). The first antenna preferably serves both as a signal transmission antenna and as a reception antenna to detect an electromagnetic field modulation induced by the response from the card.

The reader preferably sends a carrier frequency signal Fp, periodically modulated during a time T to form a recognizable interrogation signal addressed to the card and not modulated during a second time T' to receive a response from a card that may be present; the response from the card is an impedance modulation of an antenna of the card; the antenna of the card and the antenna of the reader are electromagnetically coupled when the card is in the near field, such that this modulation reacts to the impedance of the first antenna of the reader, which makes it possible to detect the response; the disturbance signal is transmitted by the reader during the time T'.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 4 represents a diagram of the invention in which the two antennas are coupled but a compensation circuit is provided;

FIG. 5 represents an antenna current probe;

FIG. 6 represents a compensation circuit that can be used in the diagram of FIG. 4;

DETAILED DESCRIPTION OF PREFERRED EMBODIMENTS

Figure 1:
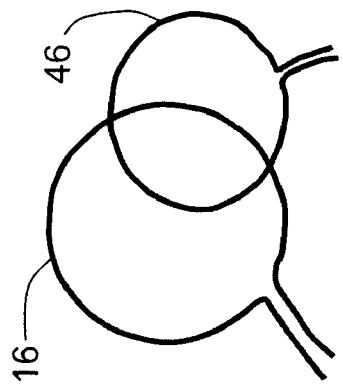
FIG. 1 represents a schematic diagram of the present invention, in a first embodiment.

FIG. 1 shows both a contactless card reader and a card present in the (near) field of the reader. The expression "field of the reader" should be understood to mean a geographic area close to the reader, in which on the one hand the card can detect an interrogation signal from the reader, and on the other hand the response from the card can be detected by the reception antenna of the reader. In practice, the response from the card acts on the antenna impedance of the reader enough for a variation of this impedance to be able to be detected.

The reader is designated by the reference 10. It comprises electronic circuits 12 necessary for transmitting interrogation signals, a power amplifier 14 to amplify these signals, and an antenna 16 to transmit signals to the card. The antenna 16 is preferably of inductive type, that is, it comprises one or more turns of an electrical conductor and this is why it is represented in FIG. 1 in the form of a winding.

The transmission antenna 16 also acts as a reception antenna, preferably as follows: its impedance will vary according to the presence of the contactless card in the near field of the reader, and according to the response from the card when the latter responds; this impedance variation occurs while the antenna is transmitting a radiofrequency signal not modulated by information.

The card 20 is provided with a transmission antenna 22, preferably also of inductive type, electromagnetically coupled to the antenna 16 of the reader when the card is in the field of the reader. The card comprises electronic circuitry 24 making it possible to vary the impedance of the antenna 22 according to a characteristic modulation. Thus, the response from the card to an enquiry from the reader can be a digital modulation of the load impedance of its antenna, which is reflected in a load impedance modulation of the reader's antenna, and it is this modulation which is detected by the antenna 16 of the reader. This modulation can be used, for example, to identify the card.

The reader also comprises electronic circuits 32 for detecting the response from the card. The antenna 16 is linked, by a filtering and amplification circuit 34, to these electronic detection circuits 32.

Typically, provision can be made for the transmission of a periodic interrogation signal by the reader to comprise two phases Φ1 and Φ2, of respective durations T and T'. During the first phase Φ1, the circuits 12 of the reader transmit through the amplifier 14 and the antenna 16 a carrier frequency Fp (13.56 MHz for example), amplitude or frequency modulated by a characteristic binary signal that a card 20 can recognize. If a card is present, it picks up this signal by its antenna 22; if it does not include an independent power source, the signal picked up can also serve as a power source: it is rectified and used to produce a power supply voltage for the card's electronic circuits.

During the second phase Φ2, the reader continues to transmit the carrier frequency and the card sends its response; for this, the electronic circuits 24 of the card can typically binarily modulate a subcarrier frequency Fsp (at 847.5 kHz for example) and the carrier frequency Fsp; the modulation can be a modulation of the antenna's load. The modulation can be used to transmit binary information that can be an identification of the card, encrypted or unencrypted.

The reader detects, through its antenna 16, these impedance variations modulated at 847.5 kHz; the antenna 16 therefore collects the response from the card, for example its identification; the amplification and filtering circuit 34 isolates this modulation and transmits it to the detection circuits 32 of the reader. The reader analyses and transmits the corresponding information to an external system, for example to enable or prevent access to a place according to the detected identity.

According to the invention, provision is made for the reader also to include an electronic circuit 42 creating a radiofrequency disturbance signal in the environment located between the reader and the card. This signal is amplified by an amplifier 44 and applied to an additional antenna or second antenna 46 of the reader. The disturbance signal is of the same type as the response signal from the card. In particular, it can comprise a carrier frequency Fp (13.56 MHz if the reader operates at this frequency), modulated by a subcarrier at frequency Fsp (847.5 kHz if the subcarrier modulated by the card is at this frequency), and a modulation of this subcarrier by a pseudo-random binary signal resembling the response modulation of a card. The pseudo-random binary signal which is thus used to disturb the environment of the card is preferably a series of bits supplied by a pseudo-random binary sequence generator operating at the same rate as the binary response modulation of the card.

Provision is also made, in this exemplary embodiment of the invention, for the electromagnetic coupling between the first antenna 16 and the second antenna 46 of the reader to be as low as possible, in order for the impedance variations of the antenna 16, caused by the response from the card, not to be disturbed by the disturbance signal transmitted by the antenna 46.

Thus, a malicious person placing an electromagnetic measuring probe in the gap between the reader and the card, to try to detect the electromagnetic field variations induced by the response from the card, can detect only field variations which mix the response from the card with the disturbance signal, which resembles, in bandwidth and in modulation type, the response of another card. He can therefore not use the detected information.

On the other hand, the antenna 16 of the reader will be unaffected by the disturbance signal.

Figure 2:
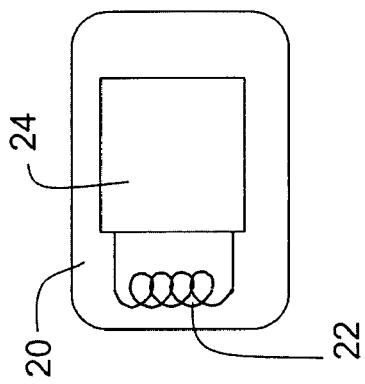
FIG. 2 represents a way of obtaining a zero electromagnetic coupling between two antennas.

To obtain an electromagnetic coupling that is as low as possible between the two antennas, it is possible in particular to provide for the antennas to consist of conductive turns which are arranged substantially in the same plane but which partly overlap as is represented in FIG. 2.

In FIG. 2, it is assumed, in order to simplify the representation, that the antennas 16 and 46 each comprise a single conductive turn. The partial overlap of the two antennas is chosen such that the coupling between them is minimal and if possible practically zero. It will be understood that this minimum results from the fact that a part of the electromagnetic flux transmitted by one of the antennas passes through the other antenna, in one direction in the position of the overlap area and all the more so as there is more overlap and in the other direction outside of the overlap area and all the less so as there is more overlap, so that there is a possible overlap configuration such that the resultant flux is cancelled out. It is in this configuration that the electromagnetic coupling between the antennas is minimal, or even zero.

It would also be possible to provide for the turns of one antenna to be arranged orthogonally to the turns of the other. However, this would have the drawback of making it easier for an external probe to identify the component due to the antenna 16 and the component due to the antenna 46.

Figure 3:
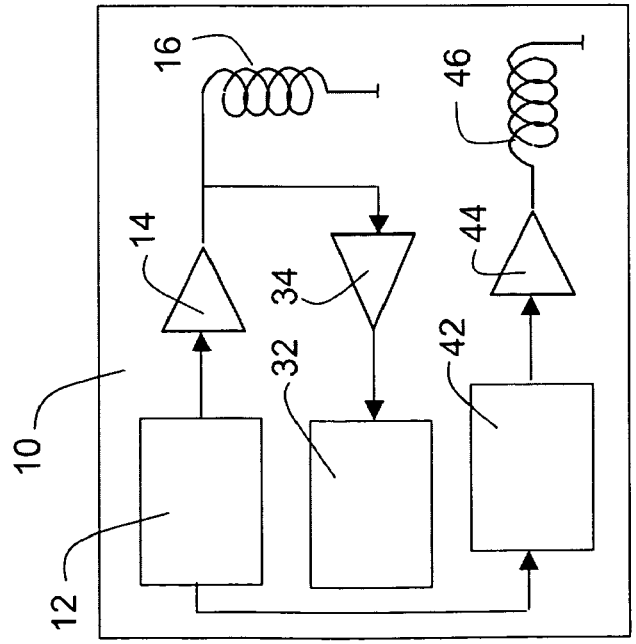
FIG. 3 represents a circuit for creating disturbance signals.
Figure 3:
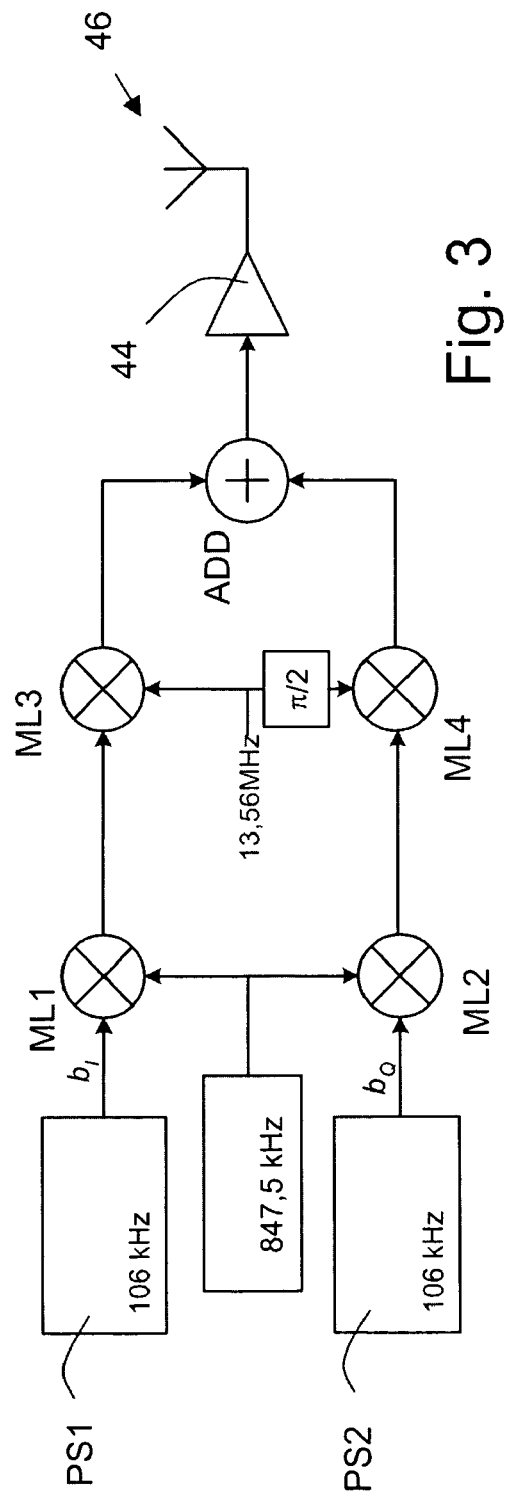

FIG. 3 represents an exemplary electronic circuit 42 making it possible to synthesize and transmit a disturbance signal. In this example, the basis is two pseudo-random sources PS1 and PS2 transmitting pseudo-random binary sequences $b_i$ and $b_q$ at a rate which is the transmission rate of the response bits from a card, in this case 106 kilobits/second (still assuming that the cards modulate a subcarrier at 847.5 kHz with a carrier Fp at 13.56 MHz). The two sources PS1 and PS2 are each applied to an input of respective mixers ML1 and ML2 which also receive the subcarrier frequency Fsp, from electronic transmission circuits 12 of the reader. The outputs of the mixers are each applied to an input of two other mixers ML3 and ML4 which also receive the carrier frequency Fp but with a phase shift of $\pi/2$ for this carrier between the inputs of the two mixers ML3 and ML4. The outputs of the mixers ML3 and ML4 are applied to the inputs of an adder ADD, the output of which is amplified by an amplifier 42 and applied to the antenna 46. The transmitted signal is therefore a signal at the carrier frequency of 13.56 MHz, both amplitude and phase modulated, which can be used to scramble any type of load modulation, amplitude or phase or both, due to the response from the card.

The disturbance signal is thus exactly equivalent to the authentic response signal from a card, but the modulation bits are random. Outside the reader, an electromagnetic field probe would detect only an undecodable mix between the modulation of the authentic response from the card and the modulation by the pseudo-randomly transmitted bits. However, because of the zero coupling between the antennas 16 and 46, the antenna 16 does not receive field variations due to the disturbance signal and it can transmit only the authentic response from the card.

FIG. 4 represents a second embodiment of the invention. In this second embodiment, the coupling between the antenna 16 and the antenna 46 is not zero, but a compensation circuit injects into the antenna 16 a current which is proportional to the disturbance signal but phase-shifted relative to the latter, such that the injected current neutralizes the effect of the electromagnetic coupling from the antenna 46 to the antenna 16. In this way, the effect of the disturbance signal transmitted by the antenna 46 will not be felt on the antenna 16, whereas this effect would be felt on a measuring probe placed in the field of the reader.

The disturbance signal can be of the same type as that which has been indicated previously; FIG. 4 represents a configuration in which the disturbance acts in the form of a variable load placed in parallel with the antenna 46, this load having a value that varies pseudo-randomly.

The compensation circuit theoretically comprises a current probe 52 placed on the power supply conductor of the antenna 46, a circuit 54 for amplifying and phase-shifting the current measured by the probe, and a transformer (represented in FIG. 4 in the form of a winding 56 coupled to the antenna winding 16) to inject into the antenna 16 a current that is amplified and phase-shifted that neutralizes the influence on the antenna 16 of the electromagnetic field variations due to the disturbance signal transmitted by the antenna 46. The current probe can be a simple ferrite ring through which the conductor which powers the antenna 46 passes.

FIG. 5 represents the current probe 52 using a wound ferrite ring through which the power supply conductor of the antenna 46 passes. The ferrite ring is used to channel the magnetic field lines induced by the antenna current. The probe introduces into the antenna circuit a very low series impedance. The current I1 passing through the antenna induces a voltage V2 proportional to I1, which is applied to the amplification and phase-shifting circuit 54.

FIG. 6 represents a possible construction of the compensation circuit: from the output of the current probe 52, the voltage V2 is amplified by an amplifier A1 (phase-shifter if necessary) and converted into current in a load resistor R of the amplifier, this resistor being placed in series for example with a second ferrite ring of very low impedance. The second ferrite ring is passed through by the conductor which carries the signals to the antenna 16, or by a turn of the antenna winding. The second ferrite ring is used to form the transformer 56 mentioned above.

Figure 7:
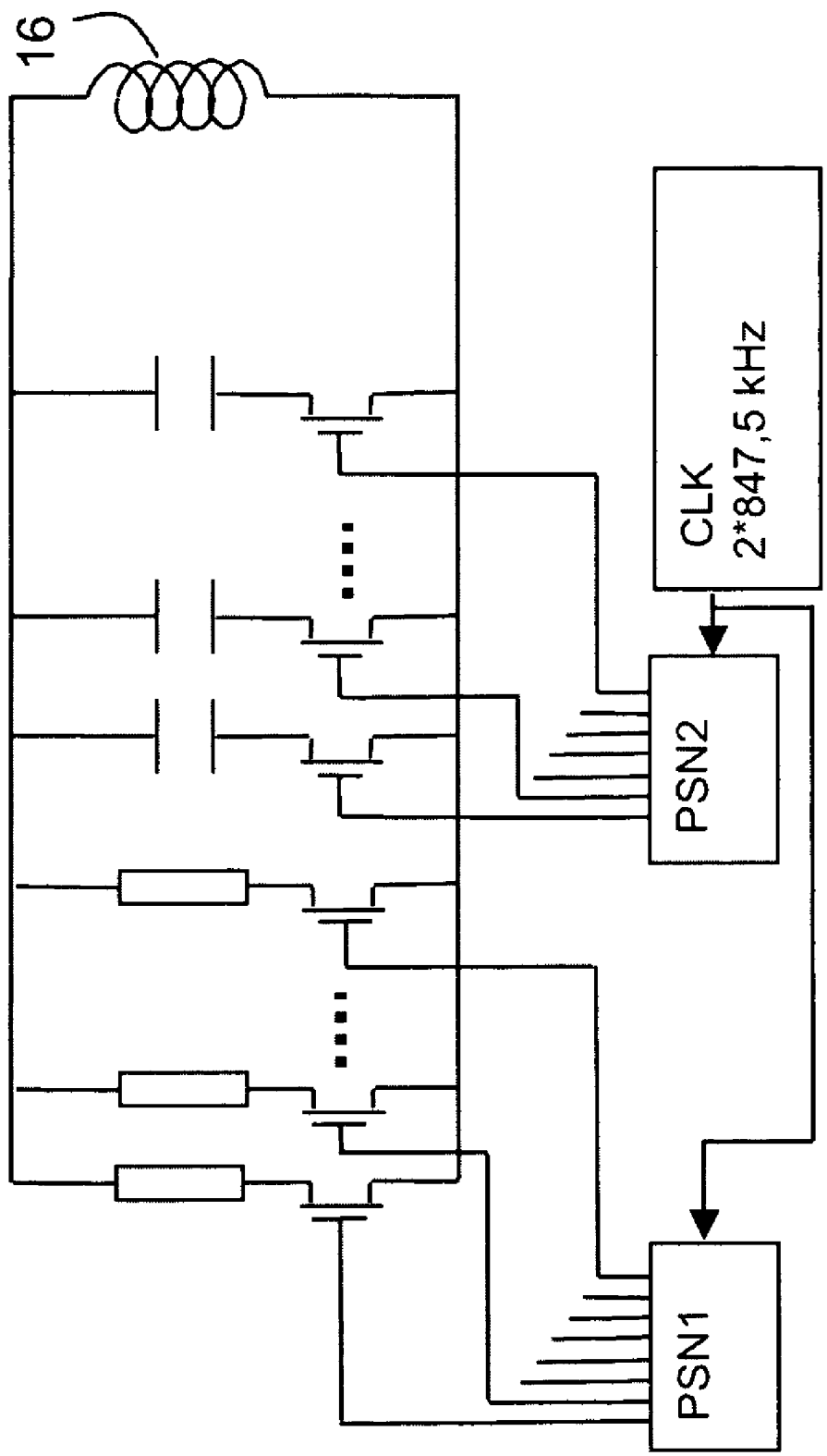
FIG. 7 represents another diagram of a circuit for creating disturbance signals.

Finally, it is possible to provide, in the FIG. 4 arrangement, for the circuit for generating the disturbance signal 42 to be constructed as represented in FIG. 7: this embodiment uses a network of resistors and a network of capacitors. The resistors can be selectively placed in parallel with each other, and with the capacitors, the selected capacitors being then in parallel with the selected resistors. The selection is controlled by two pseudo-random sequence generators PSN1 and PSN2, one acting on the resistor network, the other on the capacitor network. A switching transistor is placed in series with each resistor or capacitor and the gates of the transistors are controlled by the two generators which have multiple parallel outputs. The generators transmit pseudo-random sequences which are sequences of successive numbers obeying a pseudo-random rule.

The pseudo-random sequence generators are preferably controlled by a clock CLK at a frequency twice the subcarrier frequency Fsp; this double frequency is in this case 1695 kHz.

The parallel connection of resistors and capacitors selected pseudo-randomly in this way creates a variable load in parallel with the antenna 46, and it is the fact that this load is variable that modifies the electromagnetic field in the vicinity of the reader and which scrambles the response from the card.

The current measuring probe 52 is not represented in FIG. 7.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Secure communication system between a contactless card reader and a card, said reader being adapted for transmitting an electromagnetic radiofrequency communication signal addressed to said card located in the near field and said card being adapted for transmitting a response message which is to be protected against an undesirable detection, the reader detecting the response signal by means of a first antenna and the reader comprising a circuit for generating a disturbance signal to create a disturbance signal at the same time as the response signal is transmitted by the card, wherein the circuit for generating the disturbance signal is able to transmit a disturbance signal with the same frequency and modulation type characteristics as the response signal expected from the card to the reader, said circuit for generating a disturbance signal comprising a second radiofrequency transmission antenna, separate from the first antenna, for transmitting the disturbance signal, the electromagnetic coupling between the two antennas being such that the first antenna retransmits to the reader mainly the response from the card but not the disturbance signal.

2. The system according to claim 1, wherein the two antennas are positioned relative to each other in such a way as to have a minimal, preferably zero, mutual electromagnetic coupling, such that the first antenna does not receive or practically does not receive the signal transmitted by the second antenna.

3. The system according to claim 2, wherein the two antennas comprise conductive turns located substantially in one and the same plane and with partial mutual overlap.

4. The system according to claim 3, wherein the reader is adapted to transmit a signal at a carrier frequency Fp, periodically modulated during a time T to form a recognizable interrogation signal addressed to the card and not modulated during a second time T' to receive a response from a card that may be present, the response from the card being an impedance modulation of an antenna of the card, the antenna of the card and the antenna of the reader being electromagnetically coupled when the card is in the near field, such that this modulation reacts to the impedance of the first antenna of the reader.

5. The system according to claim 3, wherein the circuit for generating a disturbance signal comprises two pseudo-random binary sequence generators, a first and a second mixers for mixing these sequences with a subcarrier frequency, a third mixer for mixing the signal obtained from the first mixer with a carrier frequency, and a fourth mixer for mixing the signal obtained from the second mixer with the same carrier frequency but phase-shifted by $\pi/2$, the output signals of the third and fourth mixers being added together before being applied to the second antenna.

6. The system according to claim 2, wherein the reader is adapted to transmit a signal at a carrier frequency Fp, periodically modulated during a time T to form a recognizable interrogation signal addressed to the card and not modulated during a second time T' to receive a response from a card that may be present, the response from the card being an impedance modulation of an antenna of the card, the antenna of the card and the antenna of the reader being electromagnetically coupled when the card is in the near field, such that this modulation reacts to the impedance of the first antenna of the reader.

7. The system according to claim 2, wherein the circuit for generating a disturbance signal comprises two pseudo-random binary sequence generators, a first and a second mixers for mixing these sequences with a subcarrier frequency, a third mixer for mixing the signal obtained from the first mixer with a carrier frequency, and a fourth mixer for mixing the signal obtained from the second mixer with the same carrier frequency but phase-shifted by $\pi/2$, the output signals of the third and fourth mixers being added together before being applied to the second antenna.

8. The system according to claim 1, comprising
a current measuring probe in a circuit powering the second antenna,
and a compensation circuit for compensating the signal received by the first antenna, the compensation circuit being connected on the one hand to the current measuring probe and on the other hand to the first antenna for applying to the first antenna a signal neutralizing the effect on the first antenna of the disturbance signal transmitted by the second antenna.

9. The system according to claim 8, wherein the reader is adapted to transmit a signal at a carrier frequency Fp, periodically modulated during a time T to form a recognizable interrogation signal addressed to the card and not modulated during a second time T' to receive a response from a card that may be present, the response from the card being an impedance modulation of an antenna of the card, the antenna of the card and the antenna of the reader being electromagnetically coupled when the card is in the near field, such that this modulation reacts to the impedance of the first antenna of the reader.

10. The system according to claim 8, wherein the circuit for generating a disturbance signal comprises two pseudo-random binary sequence generators, a first and a second mixers for mixing these sequences with a subcarrier frequency, a third mixer for mixing the signal obtained from the first mixer with a carrier frequency, and a fourth mixer for mixing the signal obtained from the second mixer with the same carrier frequency but phase-shifted by $\pi/2$, the output signals of the third and fourth mixers being added together before being applied to the second antenna.

11. The system according to claim 1, wherein the antennas are of inductive type.

12. The system according to claim 11, wherein the circuit for generating a disturbance signal comprises two pseudo-random binary sequence generators, a first and a second mixers for mixing these sequences with a subcarrier frequency, a third mixer for mixing the signal obtained from the first mixer with a carrier frequency, and a fourth mixer for mixing the signal obtained from the second mixer with the same carrier frequency but phase-shifted by $\pi/2$, the output signals of the third and fourth mixers being added together before being applied to the second antenna.

13. The system according to claim 1, wherein the reader is adapted to transmit a signal at a carrier frequency Fp, periodically modulated during a time T to form a recognizable interrogation signal addressed to the card and not modulated during a second time T' to receive a response from a card that may be present, the response from the card being an impedance modulation of an antenna of the card, the antenna of the card and the antenna of the reader being electromagnetically coupled when the card is in the near field, such that this modulation reacts to the impedance of the first antenna of the reader.

14. The system according to claim 13, wherein the circuit for generating a disturbance signal comprises two pseudo-random binary sequence generators, a first and a second mixers for mixing these sequences with a subcarrier frequency, a third mixer for mixing the signal obtained from the first mixer with a carrier frequency, and a fourth mixer for mixing the signal obtained from the second mixer with the same carrier frequency but phase-shifted by $\pi/2$, the output signals of the third and fourth mixers being added together before being applied to the second antenna.

15. The system according to claim 1, wherein the circuit for generating a disturbance signal comprises two pseudo-random binary sequence generators, a first and a second mixers for mixing these sequences with a subcarrier frequency, a third mixer for mixing the signal obtained from the first mixer with a carrier frequency, and a fourth mixer for mixing the signal obtained from the second mixer with the same carrier frequency but phase-shifted by $\pi/2$, the output signals of the third and fourth mixers being added together before being applied to the second antenna.

* * * * *